United States Patent
Pershikova et al.

(10) Patent No.: US 9,206,343 B2
(45) Date of Patent: Dec. 8, 2015

(54) PUMPABLE GEOPOLYMERS COMPRISING A SETTING ACCELERATOR

(75) Inventors: Elena Pershikova, Paris (FR); Olivier Porcherie, Paris (FR); Slaheddine Kefi, Velizy Villacoublay (FR); Yamina Boubeguira, les Moulineaux (FR); Hafida Achtal, Argenteuil (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 542 days.

(21) Appl. No.: 13/511,145

(22) PCT Filed: Nov. 10, 2010

(86) PCT No.: PCT/EP2010/006958
§ 371 (c)(1),
(2), (4) Date: Jul. 3, 2012

(87) PCT Pub. No.: WO2011/072786
PCT Pub. Date: Jun. 23, 2011

(65) Prior Publication Data
US 2012/0267106 A1 Oct. 25, 2012

(30) Foreign Application Priority Data
Dec. 17, 2009 (EP) ..................... 09179720

(51) Int. Cl.
| | | |
|---|---|---|
| *E21B 33/13* | (2006.01) | |
| *C04B 28/02* | (2006.01) | |
| *C09K 8/42* | (2006.01) | |
| *C04B 28/00* | (2006.01) | |
| *C04B 103/12* | (2006.01) | |
| *C04B 111/00* | (2006.01) | |

(52) U.S. Cl.
CPC .............. *C09K 8/42* (2013.01); *C04B 28/006* (2013.01); *E21B 33/13* (2013.01); *C04B 28/02* (2013.01); *C04B 2103/12* (2013.01); *C04B 2111/00146* (2013.01)

(58) Field of Classification Search
CPC ...... C04B 24/383; C04B 28/02; C04B 24/06; C04B 24/005; C04B 2103/12; C09K 8/467; C09K 8/42
See application file for complete search history.

(56) References Cited

U.S. PATENT DOCUMENTS

| | | |
|---|---|---|
| 4,509,985 A | 4/1985 | Davidovitz et al. |
| 4,859,367 A | 8/1989 | Davidovitz |
| 5,339,903 A | 8/1994 | Eoff et al. |
| 5,349,118 A | 9/1994 | Davidovitz |
| 5,356,579 A | 10/1994 | Jennings et al. |
| 5,539,140 A | 7/1996 | Davidovitz |
| 5,626,665 A | 5/1997 | Barger et al. |
| 5,635,292 A | 6/1997 | Jennings et al. |
| 5,637,412 A | 6/1997 | Jennings et al. |
| 5,788,762 A | 8/1998 | Barger et al. |
| 2007/0015678 A1 | 1/2007 | Rodrigues et al. |
| 2007/0102160 A1 | 5/2007 | Jones et al. |
| 2007/0129260 A1* | 6/2007 | Caveny et al. ............. 507/209 |
| 2008/0028994 A1 | 2/2008 | Barlet-Gouedard et al. |
| 2011/0073311 A1* | 3/2011 | Porcherie et al. ........ 166/305.1 |
| 2011/0132232 A1* | 6/2011 | Catalan et al. ............ 106/695 |

FOREIGN PATENT DOCUMENTS

| | | |
|---|---|---|
| EP | 1887065 | 11/2010 |
| WO | 2005/019130 | 3/2005 |
| WO | 2008/017413 | 2/2008 |
| WO | 2008/017414 | 2/2008 |

OTHER PUBLICATIONS

"Synthesis of new high-temperature geo-polymers for reinforced plastics/composites", SPE PACTEC' 79, Society of Plastics Engineers, 1979.
G. Daccord, B. Craster, H. Ladva, T.G.J. Jones, G. Manescu, "Cement-FormationInteractions," Well Cementing, Second Edition by E. Nelson and D. Guillot, 2006, pp. 191-232.
A.H. Mahmoudkhani, et al., "New Environment-Friendly Cement Slurries With Enhanced Mechanical Properties" SPE115004, 2008.

* cited by examiner

*Primary Examiner* — Zakiya W Bates
(74) *Attorney, Agent, or Firm* — Jeremy D. Tillman; Rachel E. Greene; Tim Curington

(57) ABSTRACT

A carbohydrate-based compound is used as a setting accelerator in a pumpable geopolymeric suspension for oil and/or gas industry applications. The suspension further comprises an aluminosilicate source, a carrier fluid, and an activator. The suspensions may be placed in a subterranean well and used for well primary cementing operations and/or remedial applications.

18 Claims, 2 Drawing Sheets

PUMPABLE GEOPOLYMERS COMPRISING A SETTING ACCELERATOR

FIELD OF THE INVENTION

The present invention relates to pumpable geopolymer formulations or suspensions, and their uses, in particular, for oil and/or gas industry applications.

DESCRIPTION OF THE PRIOR ART

Geopolymers are a novel class of materials that are formed by chemical dissolution and subsequent recondensation of various aluminosilicate oxides and silicates to form an amorphous three-dimensional framework structure. The term geopolymer was proposed and first used by J. Davidovits (Synthesis of new high-temperature geo-polymers for reinforced plastics/composites, SPE PACTEC' 79, Society of Plastics Engineers) in 1976 at the IUPAC International Symposium on Macromolecules held in Stockholm. Other terms have been used to describe materials synthesized utilizing a similar chemistry, such as alkali-activated cement, geocement, alkali-bonded ceramic, inorganic polymer, hydroceramic. In the following description, the term geopolymer will be used.

Geopolymers based on alumino-silicates are generally designated as poly(sialate), which is an abbreviation for poly (silicon-oxo-aluminate) or $(-Si-O-Al-O-)_n$ (with n being the degree of polymerization). The sialate network consists of $SiO_4$ and $AlO_4$ tetrahedra linked alternately by sharing all the oxygens, with $Al^{3+}$ and $Si^{4+}$ in IV-fold coordination with oxygen. Positive ions ($Na^+$, $K^+$, $Li^+$, $Ca^{2+}$, ...) must be present in the framework cavities to balance the charge of $Al^{3+}$ in IV-fold coordination.

The empirical formula of polysialates is: $M_n\{-(SiO_2)_z-AlO_2\}_n$, w $H_2O$, wherein M is a cation such as potassium, sodium or calcium, n is a degree of polymerization and z is the atomic ratio Si/Al which may be 1, 2, 3 or more, until 35 as known today.

The three-dimensional network (3D) geopolymers are summarized in the table below.

TABLE 1

Geopolymers chemical designation (wherein M is a cation such as potassium, sodium or calcium, and n is a degree of polymerization)

| Si/Al ratio | Designation | Structure | Abbreviations |
|---|---|---|---|
| 1 | Poly(sialate) | $M_n(-Si-O-Al-O-)_n$ | (M)-PS |
| 2 | Poly(sialate-siloxo) | $M_n(-Si-O-Al-O-Si-O)_n$ | (M)-PSS |
| 3 | Poly(sialate-disiloxo) | $M_n(-Si-O-Al-O-Si-O-Si-O-)_n$ | (M)-PSDS |

The properties and application fields of geopolymers will depend principally on their chemical structure, and more particularly on the atomic ratio of silicon versus aluminum. Geopolymers have been investigated for use in a number of applications, including as cementing systems within the construction industry, as refractory materials, as coatings, as ceramic precursors and as encapsulants for hazardous and radioactive waste streams. Geopolymers are also referenced as rapid setting and hardening materials. Compared to conventional Portland cement, they typically exhibit superior hardness and chemical stability.

First step of geopolymer synthesis involves the suspension of solid raw materials, such as the above mentioned aluminosilicates, into a carrier fluid. The fluid-to-solid ratio of this suspension affects properties of the suspension, such as for example, its viscosity and hardening time, and the properties of the hardened material obtained from the same suspension. Adjustment of the viscosity of this geopolymeric suspension without altering the other properties is critical in many applications such as the homogeneous coating thickness, the molding of ceramics pieces or the placement of the cement in building structure or in well cementing.

Well cementing, in particular, implies the control of the viscosity of the suspension at various temperatures encountered by the fluid in order to achieve a good placement of the fluid, while the fluid-to-solid ratio affects other critical parameters of well cementing operation such as for example the density of the suspension, the permeability and the mechanical properties of the hardened material.

Different prior art documents disclose the use of geopolymer compositions in the construction industry. In particular U.S. Pat. No. 4,509,985 discloses a mineral polymer composition employed for the making of cast or molded products at room temperatures, or temperatures generally up to 120° C.; U.S. Pat. No. 4,859,367, U.S. Pat. No. 5,349,118 and U.S. Pat. No. 5,539,140 disclose a geopolymer for solidifying and storing waste material in order to provide the waste material with a high stability over a very long time, comparable to certain archeological materials, those waste materials can be dangerous and even potentially toxic for human beings and the natural environment; U.S. Pat. No. 5,356,579, U.S. Pat. No. 5,788,762, U.S. Pat. No. 5,626,665, U.S. Pat. No. 5,635, 292 U.S. Pat. No. 5,637,412 and U.S. Pat. No. 5,788,762 disclose cementitious systems with enhanced compressive strengths or low density for construction applications. WO2005019130 highlights the problem of controlling the setting time of the geopolymer system in the construction industry.

More recently WO2008017414 A1 and WO2008017413 A1, describe the application of the geopolymers in the oilfield industry. These documents state that, besides rapid strength development required in construction application, cementing oilfield applications require the control of other properties such as the mixability, pumpability, stability, thickening and setting times for large temperature and density ranges of geopolymer slurries. They mention different routes to control the thickening time, such as the nature and/or the pH and/or the concentration of the activator and/or the concentration of the alkali metal silicate. Additives controlling the thickening and setting times, such as setting accelerators or retarders, are also described in these documents. More precisely, setting accelerators such as alkali metal, salt of lithium and lithium chloride, are mentioned.

Simple and modified carbohydrates are already used in the cementing industry, and, more particularly in well cementing operations. Simple carbohydrates such as sugar are used to delay the setting time of Portland-based slurries.

SUMMARY OF THE INVENTION

Considering the above, the present description aims at proposing a settable geopolymer composition comprising at least one additive that is capable of accelerating the thickening and the setting of geopolymeric suspensions, especially at ambient and low temperature.

According to a first aspect, embodiments concern the use of a carbohydrate-based compound as a setting accelerator in a pumpable geopolymeric suspension for oil and/or gas industry applications, said suspension further comprising an aluminosilicate source, a carrier fluid, and an activator.

Preferably, the aluminosilicate source is selected from the group consisting of clays, dehydrated clays, dehydrated kaolins, fly ashes, blast-furnace slags, natural and synthetic zeolites, feldspars, dehydrated feldspars, alumina and silica sols, aluminum silicate or silica ceramic products, and mixtures thereof.

Preferably, the carrier fluid is selected from the group consisting of fresh water, sea water, brines, re-cycled water or recuperated water, and mixtures thereof.

Preferably, the activator is a base. More preferably, it is a silicate, a metal aluminate, a alkali-metal hydroxide, ammonium hydroxide, a alkaline earth metal hydroxide, sodium carbonate or a mixture thereof.

According to embodiments, the carbohydrate-based compound is a monomer. According to a second embodiment, the carbohydrate-based compound is a dimer. According to a third embodiment, the carbohydrate-based compound is a polymer. Mixtures of monomers, dimers or polymers may be used.

The carbohydrate-based compound is, for example, a saccharide or a salt thereof. In another example, the carbohydrate-based compound is a saccharide derivative of a salt thereof.

Preferably, the concentration of the carbohydrate-based compound is from 0.03% to 15% by weight of aluminosilicate. More preferably, the concentration of the carbohydrate-based compound is from 0.05% to 10% by weight of aluminosilicate. More preferably, the concentration of the carbohydrate-based compound is from 0.05% to 5% by weight of aluminosilicate.

According to a further aspect, embodiments relate to methods of preparing and placing such a suspension, which includes a first step comprising either (i) predissolving the carbohydrate-based compound in the carrier fluid that can optionally contain pre-dissolved activator or (i') blending the carbohydrate-based compound with the aluminosilicate source. It will be noted that the carbohydrate may, optionally, be admixed with the activator.

Preferably, the method according to the invention further comprises the steps of: (ii) pumping said suspension into the borehole, and (iii) allowing said suspension to set under wellbore downhole conditions and thereby to form the geopolymeric set material.

Preferably, the suspension is a pumpable composition in for use in the oil and gas industry and the suspension is able to set downhole, in an oil and/or gas well. Nevertheless, the invention may be implemented in injector wells, in particular, steam injector wells, geothermal wells, or for carbon capture and storage. More preferably, the suspension is used for performing well primary cementing operations or for remedial applications.

BRIEF DESCRIPTION OF THE DRAWINGS

Other features and aspects will be apparent from the following description and the accompanying drawings, in which.

DETAILED DESCRIPTION OF THE PREFERRED EMBODIMENTS

Embodiments relate to uses of a carbohydrate-based compound as a setting accelerator in a pumpable geopolymeric suspension, and to a method of preparing and placing such suspension downhole. According to the invention, the suspension comprises an aluminosilicate source, a carrier fluid, an activator; a setting accelerator and, if appropriate, other additives.

Preferably, the aluminosilicate source is selected from the group consisting of: clays, dehydrated clays, dehydrated kaolins (metakaolin), fly ashes, blast-furnace slags, natural and synthetic zeolites, feldspars, dehydrated feldspars, alumina and silica sols, aluminum silicate and silica ceramic products (refractories, wares, catalytic supports, bricks, structural ceramics), or a mixture thereof. In this list, more preferable, aluminosilicate sources are selected from the group consisting of calcined clay such as metakaolin, ASTM class C and F fly ashes and granulated or pelletized blast-furnace slag.

In a further embodiment, the aluminosilicate component comprises a first aluminosilicate binder and optionally one or more secondary binder components which may be chosen in the list: ground granulated blast furnace slag, fly ash, Portland cement, kaolin, metakaolin, silica fume, bauxite, alumina oxide and hydroxide.

The carrier fluid is preferably an aqueous solution such as fresh water. In another embodiment, fresh water may be substituted by the sea water, brines or re-cycled or recuperated water.

The activator is generally an alkali. Among them, silicate, a metal aluminate, a alkali-metal hydroxide, ammonium hydroxide, a alkaline earth metal hydroxide, sodium carbonate or a combination thereof are preferred. It can be carbonate salts (such as sodium carbonate), or more preferably a metal silicate, a metal aluminate, certain soluble metal hydroxide, preferably alkali-metal hydroxide such as sodium hydroxide or potassium hydroxide or alkaline earth metal hydroxide such as $Ca(OH)_2$, and combinations thereof.

The setting accelerator comprises at least a carbohydrate-based compound to accelerate the thickening and the setting of the geopolymeric suspension, especially at ambient and low temperature, for example in the range of 20° C. to 85° C. The carbohydrate-based compound is either a monomer, such as glucose, a dimer, a polymer, such as starch, or a saccharide salt, such as carboxymethylcellulose. Saccharide derivatives, and their salts, may also be used as setting accelerators according to the invention. The concentration of the carbohydrate-based compound is preferably less than 15% by weight of aluminosilicate, more preferably less than 10%, more preferably less than 5%.

Example 1

Figure 1:
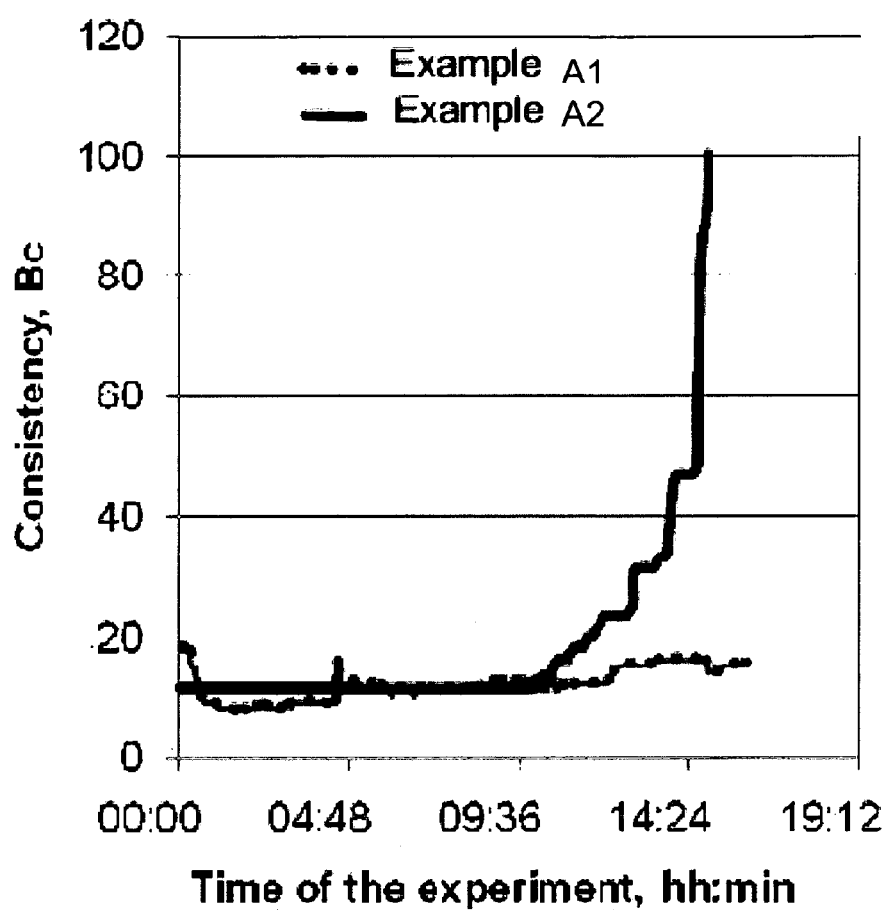
FIG. 1 illustrates the effect of the starch on the thickening time of geopolymer suspension at 40° C.

This example demonstrates the possibility to control the thickening time of the geopolymer suspensions by addition of starch. FIG. 1 illustrates the obtained effect.

A sample A1 was made by the subsequent addition of 167 g of 10 M solution of sodium hydroxide and the blend comprising 569 g of Fly ash class C, 53.5 g of sodium disilicate into 235 g of water. The prepared slurry is then placed into the pressurized consistometer and thickening time was measured according to ISO 10426-2 standard at a bottom hole circulating temperature of 40° C. according to API schedule 9.2 (recommended practice 10B, 1997).

A sample A2 was made by the pre-hydration of 4.8 g of modified starch Flotrol available from MI-SWACO in 235 g of water and subsequent addition into this solution of 161.3 g of 10 M solution of sodium hydroxide and the blend comprising 569 g of Fly ash class C, 53.5 g of sodium disilicate. The prepared slurry was then placed into the pressurized consistometer and thickening time was measured according to ISO 10426-2 standard at a bottom hole circulating temperature of 40° C. according to API schedule 9.2 (recommended practice 10B, 1997).

Example 2

The following example demonstrates the accelerating effect of the water-soluble cellulose derivatives at 40° C.

A sample B1 was made by the subsequent addition of 167 g of 10 M solution of sodium hydroxide and, the blend comprising 569 g of Fly ash class C, 53.5 g of sodium disilicate into 235 g of water. The prepared slurry was then placed into the pressurized consistometer and thickening time was measured according to ISO 10426-2 standard at a bottom hole circulating temperature of 40° C. according to API schedule 9.2 (recommended practice 10B, 1997).

A sample B2 was made by the pre-dissolution of 6.3 g of low-viscosity carboxymethylcellulose in 235 g of water and subsequent addition into this solution of 167 g of 10 M solution of sodium hydroxide and the blend comprising 569 g of Fly ash class C, 53.5 g of sodium disilicate. The prepared slurry was then placed into the pressurized consistometer and thickening time measurements were performed according at a bottom hole circulating temperature of 40° C. according to API schedule 9.2. The results are shown in the Table 2 below.

TABLE 2

Possibility to accelerate geopolymer slurries with carboxymethylcellulose at 40° C.

| Sample | | B1 | B2 |
| --- | --- | --- | --- |
| Thickening time, hh:mm | 30 Bc | Not reached during 16 h | 4:06 |
| | 70 Bc | n.m | 7:51 |
| | 95 Bc | n.m | 7:57 | n.m designates that the experiment was stopped and measurement was not taken because it took more than 16 h to achieve the consistency of 30 Bc (Bearden consistency).

The measurements are performed at a bottom hole circulating temperature of 40° C. according to API schedule 9.2.

Example 3

Figure 2:
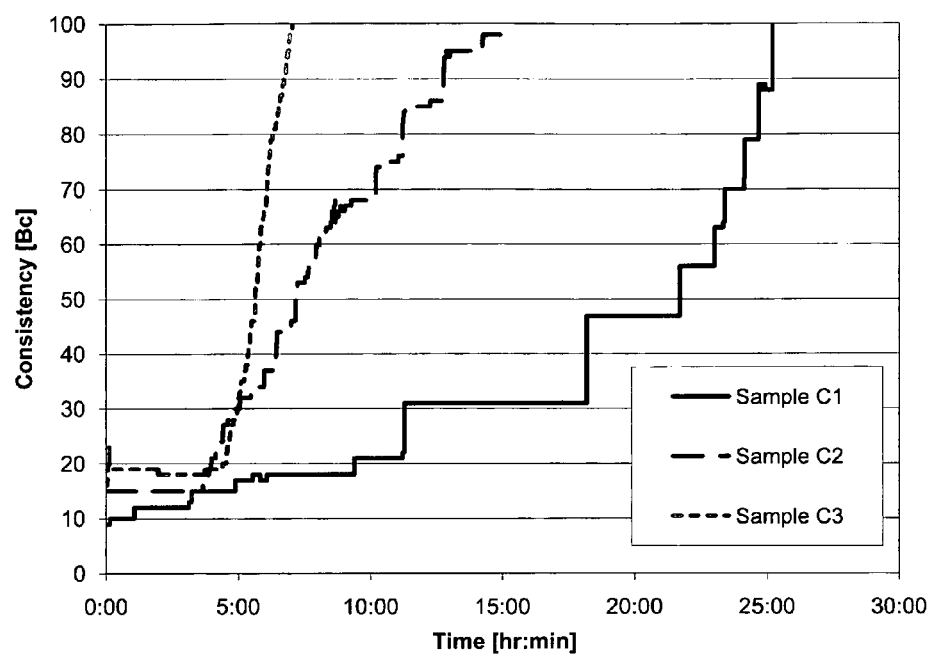
FIG. 2 illustrates the effect of glucose on the thickening time at a bottom hole circulating temperature of 25° C.

In a further aspect, a saccharide-based compound can be used as accelerating agent to shorten the thickening and setting times of geopolymeric suspensions. As shown in FIG. 2, an increasing concentration of glucose decreases the thickening time, as measured according to the ISO 10426-2 standard. These results illustrate that the mechanism involved during cement and geopolymer settings are completely different, sugar being known as retarder for cement compositions.

A sample C1 was prepared by adding the blend comprising 660 g of class C fly ash, 117 g of sodium disilicate and 6.6 g of glucose into 353 g of a solution made of water and 72 g of NaOH. The preparation was achieved according to ISO 10426-2 standard mixing procedure. Thickening time was measured according to ISO 10426-2 standard at a bottom hole circulating temperature of 25° C. according to API schedule 9.2 (recommended practice 10B, 1997).

A sample C2 was prepared by adding the blend comprising 660 g of class C fly ash, 117 g of sodium disilicate and 9.9 g of glucose into 351 g of a solution made of water and 72 g of NaOH. The preparation was achieved according to ISO 10426-2 standard mixing procedure. Thickening time was measured according to ISO 10426-2 standard at a bottom hole circulating temperature of 25° C. according to API schedule 9.2 (recommended practice 10B, 1997).

A sample C3 was prepared by adding the blend comprising 660 g of class C fly ash, 117 g of sodium disilicate and 13.2 g of glucose into 349 g of a solution made of water and 72 g of NaOH. The preparation was achieved according to ISO 10426-2 standard mixing procedure. Thickening time was measured according to ISO 10426-2 standard at a bottom hole circulating temperature of 25° C. according to API schedule 9.2 (recommended practice 10B, 1997).

The invention claimed is:

1. A method of using a carbohydrate-based compound as a setting accelerator in a pumpable geopolymeric suspension, in particular, for oil or gas industry applications or both, said suspension further comprising an aluminosilicate source, a carrier fluid and an activator, the method comprising:
   (i) preparing the suspension; and
   (ii) placing the suspension in a subterranean well and allowing the suspension to set under downhole conditions;
   wherein the suspension sets by forming a poly(sialate), a poly(sialate-siloxo) or a poly(sialate-disiloxo) network.

2. The method according to claim 1, wherein the aluminosilicate source is selected from the group consisting of clays, dehydrated clays, dehydrated kaolins, fly ashes, blast-furnace slags, natural and synthetic zeolites, feldspars, dehydrated feldspars, alumina and silica sols, aluminum silicate and silica ceramic products, or a mixture thereof.

3. The method of claim 1, wherein the carrier fluid is selected from the group consisting of fresh water, sea water, brines, re-cycled water or recuperated water, and mixtures thereof.

4. The method of claim 1, wherein the activator is an alkali.

5. The method according to claim 1, wherein the activator is a silicate, a metal aluminate, an alkali-metal hydroxide, ammonium hydroxide, an alkaline earth metal hydroxide, sodium carbonate or a mixture thereof.

6. The method of claim 1, wherein the carbohydrate-based compound is a monomer.

7. The method of claim 1, wherein the carbohydrate-based compound is a dimer.

8. The method of claim 1, wherein the carbohydrate-based compound is a polymer.

9. The method of claim 1, wherein the carbohydrate-based compound is a saccharide or a salt thereof.

10. The method of claim 1, wherein the carbohydrate-based compound is a saccharide derivative or a salt thereof.

11. The method of claim 1, wherein the concentration of the carbohydrate-based compound is less than 15% by weight of aluminosilicate.

12. The method of claim 1, wherein the suspension is used for performing well cementing primary cementing operations or for remedial applications.

13. The method of claim 1, wherein the carbohydrate-based compound comprises saccharides derivatives or salts thereof.

14. A method of preparing and placing a pumpable geopolymeric suspension into a borehole, comprising:
(i) preparing the suspension, wherein the suspension comprises an aluminosilicate source, a carrier fluid, an activator and a carbohydrate-based compound as a setting accelerator, wherein the carbohydrate-based compound is either predissolved in the carrier fluid or blended with the aluminosilicate source;
(ii) pumping the suspension into the borehole; and
(iii) allowing the suspension to set under wellbore conditions and thereby form a geopolymeric set material;
wherein the suspension sets by forming a poly(sialate), a poly(sialate-siloxo) or a poly(sialate-disiloxo) network.

15. The method according to claim 14, wherein the activator is an alkali.

16. The method according to claim 14, wherein the carbohydrate-based compound is a saccharide or a salt thereof, or a saccharide derivative or a salt thereof or combinations thereof.

17. A method of preparing and placing a pumpable geopolymeric suspension into a borehole, comprising:
(i) preparing the suspension, wherein the suspension comprises an aluminosilicate source, a carrier fluid, an activator and a carbohydrate-based compound as a setting accelerator, wherein the carbohydrate-based compound is either predissolved in the carrier fluid or blended with the aluminosilicate source;
(ii) pumping the suspension into the borehole; and
(iii) allowing the suspension to set under wellbore conditions and thereby form a geopolymeric set material,
wherein the carbohydrate-based compound is a saccharide or a salt thereof, a saccharide derivative or a salt thereof or combinations thereof, and is present in the suspension at a concentration less than 15% by weight of aluminosilicate;
wherein the suspension sets by forming a poly(sialate), a poly(sialate-siloxo) or a poly(sialate-disiloxo) network.

18. The method according to claim 17, wherein the activator is an alkali.

* * * * *